Jan. 21, 1930. A. C. MORRISSON 1,744,409
GRILL
Filed July 30, 1928
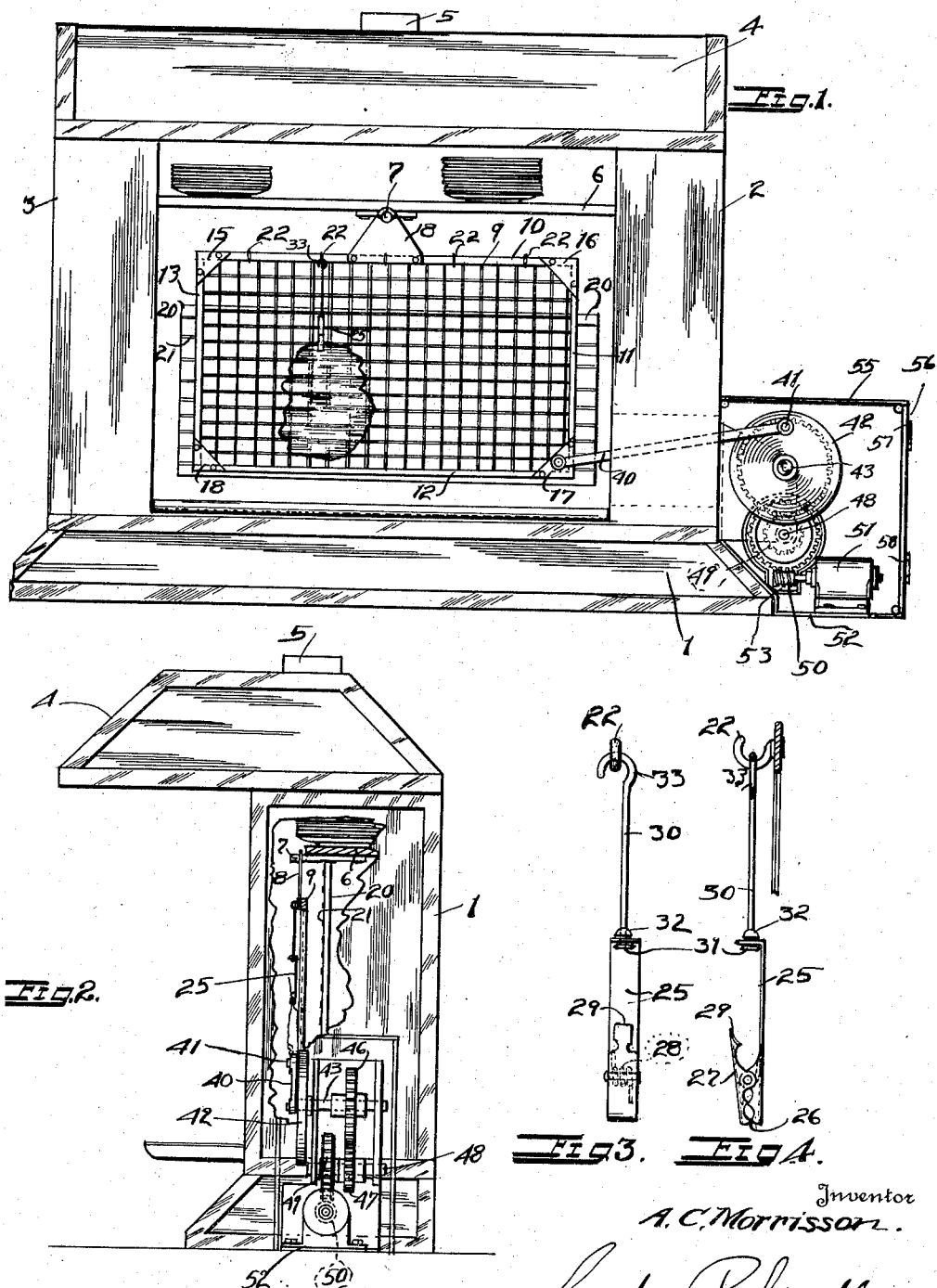
Inventor
A. C. Morrisson.
By Carlos P. Griffin
Attorney Patented Jan. 21, 1930

1,744,409

UNITED STATES PATENT OFFICE

ALBERT C. MORRISSON, OF SAN FRANCISCO, CALIFORNIA

GRILL

Application filed July 30, 1928. Serial No. 296,306.

This invention relates to a grill, and its object is to provide means whereby the time for cooking of meats may be reduced without danger of charring the same.

It will be understood by those skilled in the art that various forms of grills have been heretofore in use in which the meat is turned around before a fire whether of charcoal, gas or an electric heated series of coils. The difficulty with the continued bodily rotation of the pieces of meat is that they are necessarily at a considerable distance from the heated surface and they require some kind of a special holder into which they must be placed, and consequently the structure is expensive to make, as well as requiring a longer time to effect the desired cooking.

With the present invention an oscillating screen is used which will cause the meat to oscillate slightly and thereby prevent the charring of the meat, while at the same time it is brought closer to the heated surface thereby much reducing the time of cooking without danger of charring the meat, and at the same time making it possible to more evenly cook the meat, the cook turning the strip of meat manually from time to time as may deem necessary.

Other objects of the invention will be apparent as the description proceeds.

An embodiment of the invention is shown in the accompanying drawings in which the same reference numeral is applied to the same portion throughout the several figures of the drawings and of which there may be modifications.

Figure 1 is a front elevation of the grill, the front of the motor housing being removed for purposes of illustration, Figure 2 is an end view of the grill with the end of the motor housing removed for purposes of illustration, Figure 3 is a side elevation, and Figure 4 an end elevation of the meat holding clamp.

The grill consists of a sheet metal base 1, with suitable sheet metal supporting ends 2 and 3 with a smoke hood 4 extending over the ends and in front of the grill.

At the top of the smoke hood there is a smoke outlet connection 5 to be connected to a suitable smoke pipe.

Inside the grill there is a shelf 6 in order to take advantage of the heat generated by the heating surface used, whether gas, electricity or charcoal to provide a place for heating the service plates. This shelf has a pin 7 at its center which pin pivotally supports a plate 8 to which the screen frame 9 is secured. The screen frame 9 is bound with sheet metal at the edges as indicated at 10, 11, 12 and 13, and has reinforcing corners at 15, 16, 17 and 18. Just at the back of the roasting screen is the heating element 20, said heating element in the present instance being provided with a plurality of electrically heated coils 21 to effect the cooking of the material placed on the screen.

At the top of the screen there are a plurality of hooks 22, said hooks being for the purpose of holding the meat carrying clamps. The meat carrying clamps consist of a small flat plate 25 with teeth at its lower end as indicated at 26 to which is pivotally connected a small plate 27, the two plates being held in engagement with each other by means of a stiff spring 28. These plates are disengaged from each other by the operator pressing upon the handle 29 of the plate 27 to disengage the clamp from the meat.

The upper end of the member 25 is bent horizontally and has a hole to receive the lower end of the wire hook 30, said hook having a head 31 to prevent it from dropping the plate 25 and it has a small ball 32 thereon to prevent it from falling out of the hole in the upper end of the member 25. At its upper end it is provided with a hook 33 to make it conveniently engageable with the hook 22 on the roasting screen.

The screen 9 being pivotally mounted on the shaft 7, is oscillated by means of the pitman 40 which is pivotally connected to the lower corner of the screen 9, and to a crank pin 41 on a disk 42. The disk 42 is mounted on a shaft 43 which is journalled at the side of the casing 2. This shaft 43 has a spur gear 46 thereon in mesh with a smaller spur gear 47 on the shaft 48, the latter shaft carrying a worm wheel 49 in mesh with the worm 50 on the shaft of the motor 51.

The motor 51 is supported on a plate 52 attached to the base 1 of the machine, and there is a casing 53 which forms an oil well within which the worm 50 acts so as to insure against unduly wearing the worm and worm wheel.

A casing 55 incloses the motor and gear, said casing having a front door 56 which is hinged to the casing at 57 and 58.

The operation of the apparatus is as follows:

Assuming the heating member 20 to be heated in any suitable manner, whether by charcoal, gas, or electricity, the motor 51 will be started. This will cause the rotation of the disk 42 and an endwise swinging movement of the screen 9. This endwise swinging movement of the screen 9 will likewise cause a swinging movement of the sections of meat hung upon the screen and since they are continuously shifting in place with respect to wires of the screen such movement will effectually prevent the charring of the meat, and enable the cook to turn it by simply lifting the body of meat slightly away from the screen and allowing the reverse side to cook for a period of time. This hand reversal of the bodies of meat on the screen will take place as long as it is desired to cook the meat, after which the pieces of meat may easily be removed from the screen to be given to the customer.

It will be apparent that while hooks have been shown for securing the meat in place on the roasting screen, that the hooks 33 might themselves be individually used for hanging up the meat strips, if it is not desired to use the special hooks shown attached to the screen, such hooks being used to prevent any danger of short circuiting where an electrical heating element is used in the backing 20.

Having thus described my invention, what I desire to secure by Letters Patent of the United States is as follows, but modifications may be made in carrying out the invention as shown in the drawings and in the above particularly described form thereof, within the purview of the annexed claims:

1. A grill for cooking meats comprising a heater, an oscillating screen mounted in front of said heater and a series of meat supports, together with means to attach the meat supports to the screen to enable the pieces of meat treated to be rotated from time to time.

2. A meat cooking grill comprising a casing, a heater therein, and a grating in the front of said heater, means to oscillate said grating, and means to support a series of pieces of meat on the front of the grate whereby said bodies of meat may be rotated, from time to time and cooked as desired.

3. A casing having one open side, a heated grill surface therein, a heating element just at the rear of said grill surface, means to oscillate the grill surface, and a series of meat carrier adapted to hold a slice of meat in front carriers adapted to hold a slice of meat in front of the grating, said meat slices operating independently of said grating, and means to oscillate said grating.

4. A cooker of the class described comprising a casing, a heated surface therein, a grating pivotally suspended in front of said heated surface, means to oscillate said grating in its own plane, and a series of hooks for suspending pieces of meat in front of the grating adjacent the heated surface.

5. An apparatus of the class described comprising a casing, a heating surface therein, a pivotally suspended wire grating, means to oscillate said grating from end to end, a series of clamps adapted to each hold a strip of meat, means to connect said clamps to the screen so that the meat can be rotated occasionally to cook it from both sides, and an enclosure to carry off the smoke from the cooking operations.

6. A meat cooking grill comprising a casing, a heater therein, a grating and operable means to move said grating in the front of said heater, and means to support a series of pieces of meat on the front of the grate whereby said bodies of meat may be rotated from time to time and cooked as desired.

7. An electric grill comprising a substantially vertically mounted heating element, a screen movably mounted in front of said element, means movable with said screen for supporting meat or the like in front of said screen and including a swivel joint to enable the meat to be turned from time to time and power means adapted to move said screen.

8. Electric grill for cooking meats and the like comprising an electric heating element having a substantially upright front face, a substantially vertically positioned screen spaced from said face, means for supporting meat or the like to be grilled substantially against said screen, said supporting means including a swivel joint enabling the meat to be turned from time to time and power means and connections adapted to cause a cyclic movement of said supporting means and therefore said meat.

9. An electric grill comprising a substantially vertically mounted heating element, a screen movably mounted in front of said element, means movable with said screen for supporting meat or the like in front of said screen and including a swivel joint to enable the meat to be turned from time to time and power means adapted to move said screen and a smoke flue positioned over said element, said screen and said supporting means.

10. Electric grill for cooking meats and the like comprising an electric heating element having a substantially upright front face, a substantially vertically positioned screen spaced from said face, means for supporting meat or the like to be grilled substantially against said screen, said supporting means including a swivel joint enabling the meat to be turned from time to time and power means and connections adapted to cause a cyclic movement of said supporting means and therefore said meat, and a smoke flue positioned over said element, said screen and said supporting means.

In testimony whereof I have hereunto set my hand this 23rd day of July, A. D. 1928.

ALBERT C. MORRISSON.